United States Patent [19]

Costanza et al.

[11] 4,218,127

[45] Aug. 19, 1980

[54] SCANNING CARRIAGE DRIVE SYSTEM

[75] Inventors: Daniel W. Costanza, Webster; Dennis N. Muck, Rochester, both of N.Y.

[73] Assignee: Xerox Corporation, Stamford, Conn.

[21] Appl. No.: 38,163

[22] Filed: May 11, 1979

[51] Int. Cl.³ .................... G03G 15/28; G03B 27/48
[52] U.S. Cl. .......................................... 355/8; 355/49
[58] Field of Search .............................. 355/46–51, 355/57, 60, 66, 8, 11

[56] References Cited
U.S. PATENT DOCUMENTS

| | | | |
|---|---|---|---|
| 3,832,057 | 8/1974 | Shogren | 355/8 |
| 3,884,574 | 5/1975 | Dol et al. | 355/66 |
| 3,998,540 | 12/1976 | Weinstein | 355/8 |
| 4,125,323 | 11/1978 | Ikeda et al. | 355/8 |

*Primary Examiner*—Donald A. Griffin

[57] ABSTRACT

An optical scanning system for a compact copier wherein a scanning carriage is reciprocated beneath a platen containing an original document to be copied. The drive system for the carriage includes a cable which moves the carriage through its scan cycle while continually exerting upon the carriage a biasing moment sufficient to neutralize undesirable carriage force couples associated with high scanning rates.

1 Claim, 7 Drawing Figures

SCANNING CARRIAGE DRIVE SYSTEM

BACKGROUND

This invention relates to an optical scanning device for providing a compact copier with the ability to reproduce original documents at a relatively high copy rate. More particularly, the invention relates to improvements in the drive mechanism which moves a reciprocable carriage supporting the scanning optical components.

In the copying art, it has been found advantageous to support the original to be reproduced upon a stationary viewing platen while recording an image of the original upon a photosensitive plate. Copies of the original can then be conveniently reproduced from the plate. It has also been desirable to provide means for compacting a copying device while still maintaining a high fidelity reproduction of the original. In these devices, the optical system used to scan the original must be vertically compressed in order to achieve the required compact dimensions. An exemplary example of such a system is disclosed in U.S. Pat. No. 3,832,057. In the optical scanning arrangement disclosed thereon, a stationary viewing platen is arranged to support an original to be copied within a substantially horizontal plane. Scanning optical elements on a carriage are swept horizontally across the platen from one margin thereof to the opposite margin at a constant velocity to scan successive incremental areas of the original. Additional optical elements are disclosed to maintain the required constant conjugate length between the object plane of the system and the stationary lens disclosed therein.

While systems of the type disclosed above can produce satisfactory copy quality at relatively slow copy speeds, attempts to increase copy speed above a certain point (approximately 26 cpm) result in lead edge "skips" on the copy paper. Because of the location of the various components, the carriage mass is unequally distributed, and excessive changes of speed of the carriage, i. e. carriage deceleration from an end of scan followed by rapid acceleration at a start of scan position; create an inertial moment of force (torque) acting on the carriage. This force tends to cause the carriage to oscillate from side to side as the scanning cycle begins, the oscillation continuing until the energy is absorbed by the system. This results in blurring of the lead edge of the document being scanned.

SUMMARY

It is therefore an object of the present invention to maintain faithful reproduction of an original document in a compact copier operating at relatively high copying speeds.

According to the present invention, a copying device having a stationary platen for supporting documents is scanned at a high scanning rate by a scanning carriage reciprocated in the horizontal plane lying beneath the platen. The carriage is driven by a cable-pulley arrangement, the cable being additionally provided with a bias which produces a torque on the carriage which at least neutralizes the undesirable inertial force associated with high speed acceleration.

DRAWINGS

FIG. 5 is a graph plotting carriage velocity against time in a biased and unbiased mode of operation.

DESCRIPTION

Figure 1:
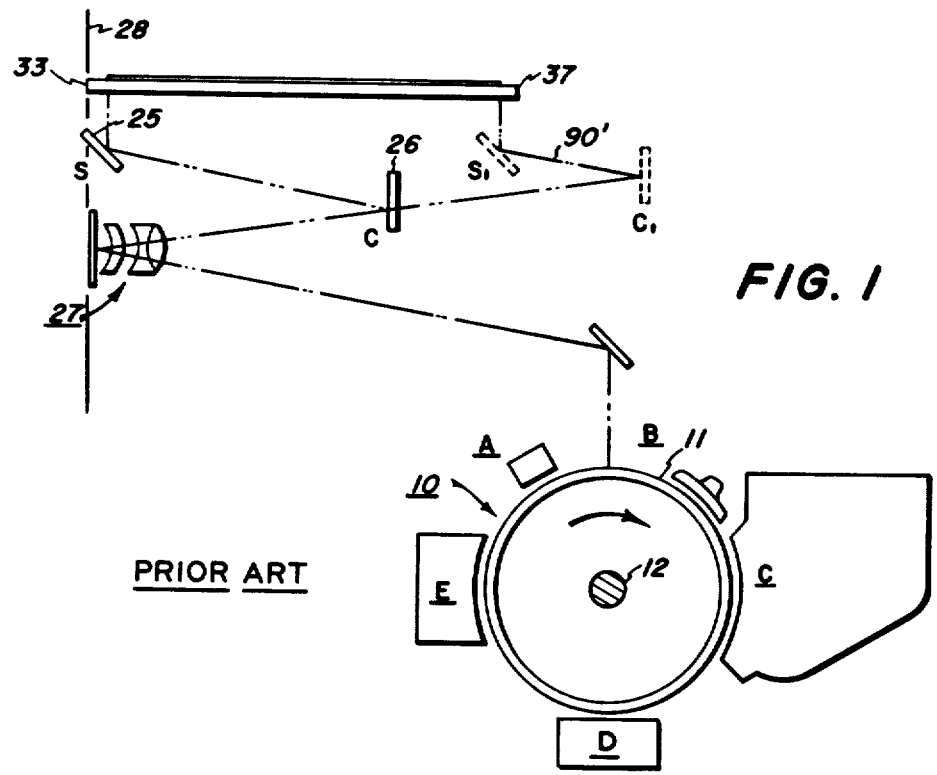
FIG. 1 represents a schematic view of a prior art scanning system.

Although the apparatus of the present invention can be used in a wide range of copier scanning devices, it is herein disclosed for explanatory purposes in reference to the optical system disclosed in U.S. Pat. No. 3,832,057. This system shown in FIGS. 1 and 2 of the present application produces a 1 to 1 reproduction of an original utilizing two scanning carriages traveling at different rates of speed in order to maintain the required total conjugate length. As shown in FIG. 1, image recording drum 10 has an outer surface upon which is coated a suitable photoconductive material 11. The drum, which is journaled for rotation with the machine frame by means of a shaft 12, rotates in the direction indicated to bring the photoconductive image recording surface thereon past a plurality of xerographic processing stations. Although not shown, it should be understood that suitable drive means are provided to both power and coordinate the movement of the various machine components whereby a faithful rendition of the original input scene information is produced.

Since the practice of xerography is well known in the art, the various processing stations for producing a copy of an original are herein represented in FIG. 1 as blocks A-E. At station A, an electrostatic charge is placed uniformly over the surface of the moving photoconductive drum surface preparatory to receiving the light image of an original to be reproduced. The charged drum surface is then moved through an exposure station B, where a flowing light image of the original is recorded on the plate in a manner to be described in greater detail below. As a result of this imaging operation the charge of a drum surface is selectively dissipated in the light exposed region thereby recording the original input scene information on the photoconductive plate surface in the form of a latent electrostatic image. Next, in the direction of drum rotation, the image bearing plate surface is transported through a development station C wherein the toner material is applied to the charged surface thereby rendering the latent electrostatic image visible. The now developed image is brought into contact with a sheet of final support material, such as paper or the like, within a transfer station D wherein the toner image is electrostatically attracted from the photoconductive plate surface to the contacting side of the support sheet. Station E represents a mechanism for cleaning toner from the drum surface.

Figure 2:
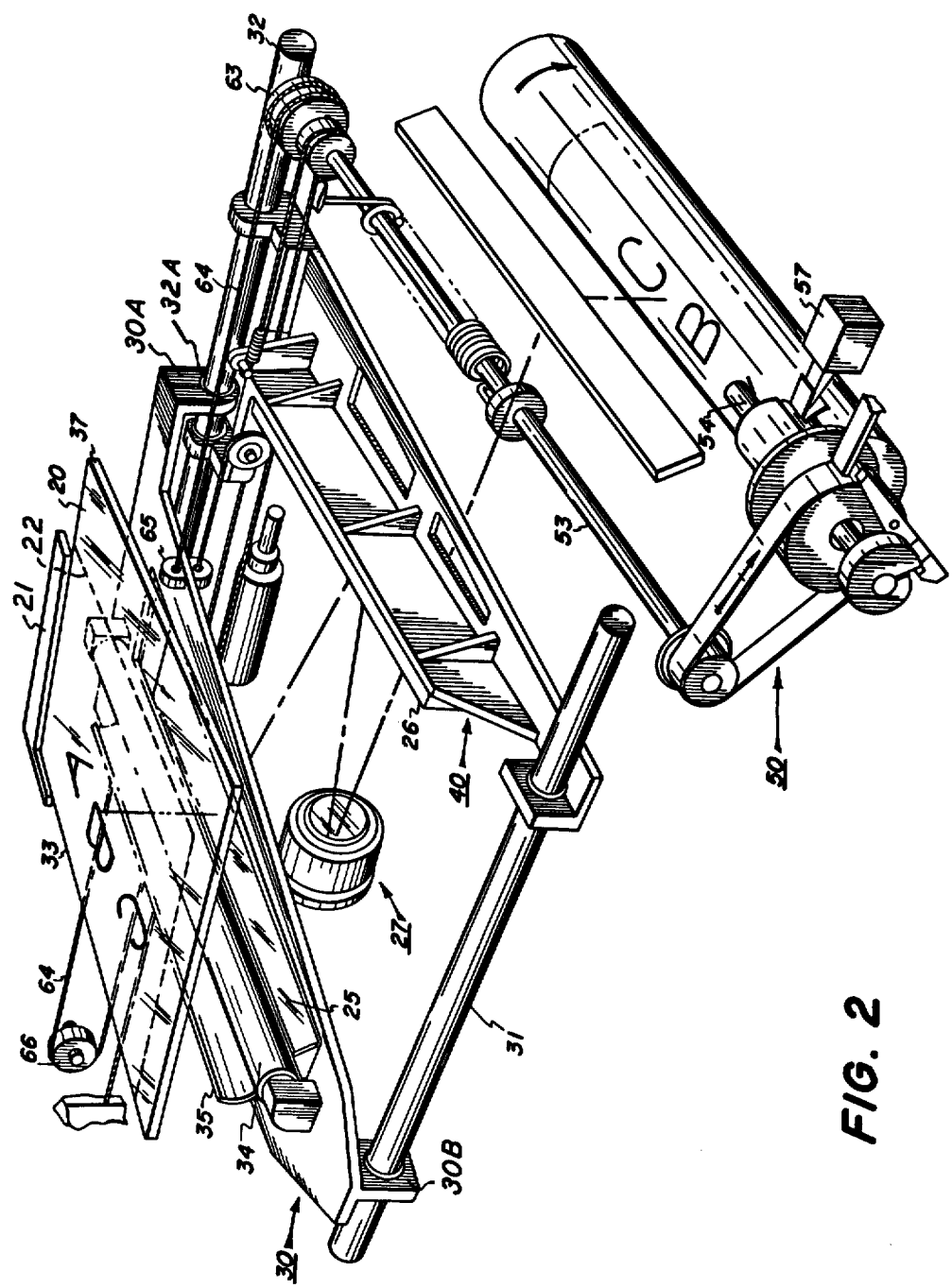
FIG. 2 is a perspective view of the scanning mechanism of FIG. 1.

Referring to FIGS. 1 and 2, scanning of a flat original document 22, supported on platen 20, is accomplished by means of a first scanning mirror 25, a second compensating mirror 26 and a stationary objective lens element 27. The scanning mirror is supported upon a carriage 30 adapted to move back and forth over a prescribed horizontal path of travel below the platen surface. To this end, carriage 30 is slidably mounted upon guide rail 32 by means of carriage mount 30A and bushings 32A, 32B (32B not visible). The outboard side of the carriage is slidably freely mounted on parallel guide rail 31 by means of carriage mount 30B. The scanning mirror 25, as positioned upon the carriage, extends transversely across the platen surface in substantially parallel alignment with the platen start of scan margin 33. Mounted directly behind the scanning mirror on the carriage is an aperture lamp 34 and a reflector 35 which cooperate to illuminate a longitudinally extending incremental area upon the platen within the viewing domain of the scanning mirror. The carriage is adapted to move across the lower surface of the platen at a constant rate whereby the mirror 25 scans successive illuminated incremental areas on the platen beginning at the start of scan margin 33 and terminating at the opposite side of the platen at the end of scan margin 37.

A two drum pulley 63 is rigidly affixed to the inboard end of the optics drive shaft 53 and adapted to turn with the shaft. The motion of drive shaft 53 is regulated by a control mechanism generally referenced as 50. Details of this control mechanism are described in U.S. Pat. No. 3,832,057, the contents of which are hereby incorporated by reference. A main drive cable 64 is wrapped about the large diameter drum of the pulley with one end of the cable anchored in the forward end of carriage 30 by means of an adapter 65 and the opposite end of the cable passed about a reversing pulley 66, attached to the rear of the machine frame and being similarly secured to the back end of the same carriage. This particular arrangement makes the scanning carriage a part of the endless loop cable system whereby the carriage responds instantly and positively to any movement of the optic drive shaft. It is noted that the top and bottom segments of cable 64 lie parallel to one another in the same vertical plane.

A second movable carriage 40 is also provided upon which is supported the compensating mirror 26. The second carriage is also slidably mounted upon the guide rails 31, 32. The support mounts of carriage 30 are arranged to move in non-interfering relationship with the support mounts of carriage 40 throughout the scanning operation. Compensating mirror 26 is positioned on the carriage 40 to receive reflected light rays emanating from the scanning mirror and redirecting these light rays back towards the stationary lens element 27.

The scanning system shown in FIG. 2 provides faithful reproduction of originals at scanning speeds of 12.7 cm/sec (equivalent to 25 cpm or less). However, if the system is speeded up to operate at a higher scan rate, deterioration of the copy occurs manifested by lead edge skipping or blurring. The reason for this effect is described below in connection with FIG. 3.

Figure 3:
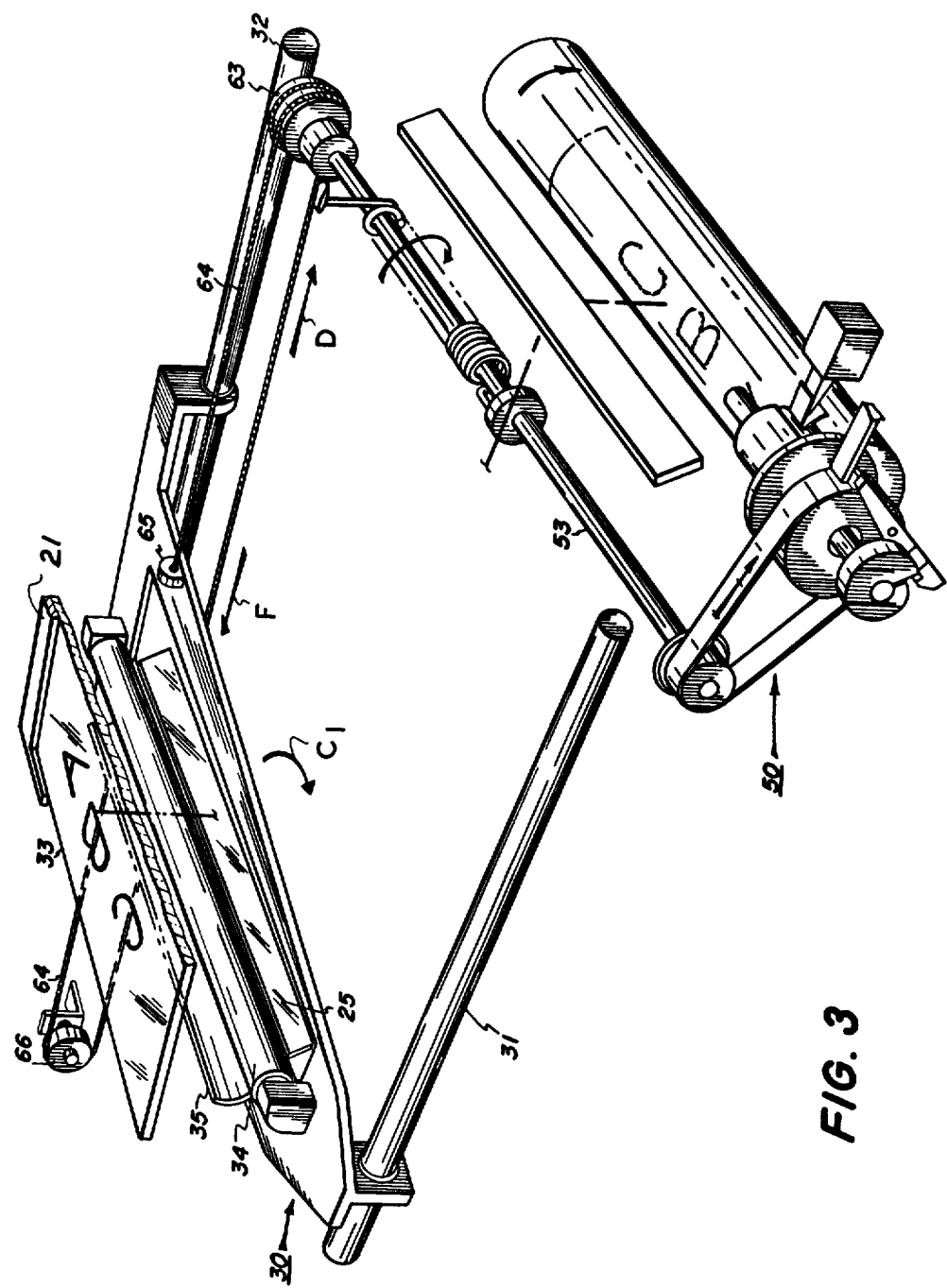
FIG. 3 is a perspective view of FIG. 2 with portions broken away to illustrate the components of force acting on the carriage during high speed operation.

FIG. 3 is another view of the FIG. 2 scanning system with various elements omitted to permit analysis of the effects of accelerated scan rate on scanning mirror carriage 30. At the initiation of a copying cycle, carriage 30 is in its home (start-of-scan) position, as shown. Shaft 53 is caused to rotate in the direction indicated in timed relation with drum 10. The motion of shaft 53 is translated to pulley 63, and thence to cable 64 creating a force D urging carriage 30 forward to begin its scanning run.

Figure 4:
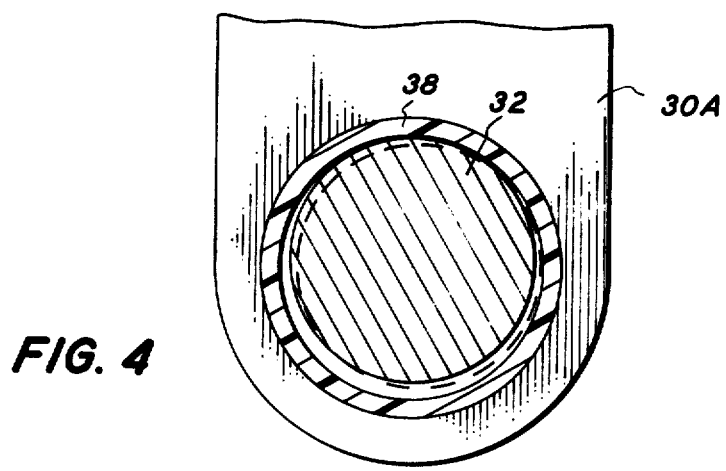
FIG. 4 is a partial sectional view of one of the contact points between carriage and guide rail.

As carriage 30 is accelerated up to speed, an inertial force F in an opposing direction to force D and in the same plane is present at the carriage center of mass. At the lower scan rate, this force is smoothly overcome with the cable 64 advancing the carriage at a uniform rate. When the critical scan velocity is exceeded, the force couple $C_1$ produced by forces D and F is sufficient to rotate the carriage in a clockwise direction as shown (looking down on the scanning carriage). The effect of this movement can best be appreciated by examining the enlarged view of sliding contact point 32A on rail 32 as shown in FIG. 4. As shown, bushing 38, which can be a film of plastic impregnated with Teflon, provides a sliding interface between carriage mount 30A and the guide rail 32. In normal low speed operation, carriage 30 is gliding along the top of rail 32 drawn in solid line. It is evident that in this position, there is some degree of clearance on both sides of rail 32. When in this position, carriage mount 30B, which defines the outboard plane of travel, is also riding freely with an equally distributed clearance between the rail and the interface surface.

Figure 5A:
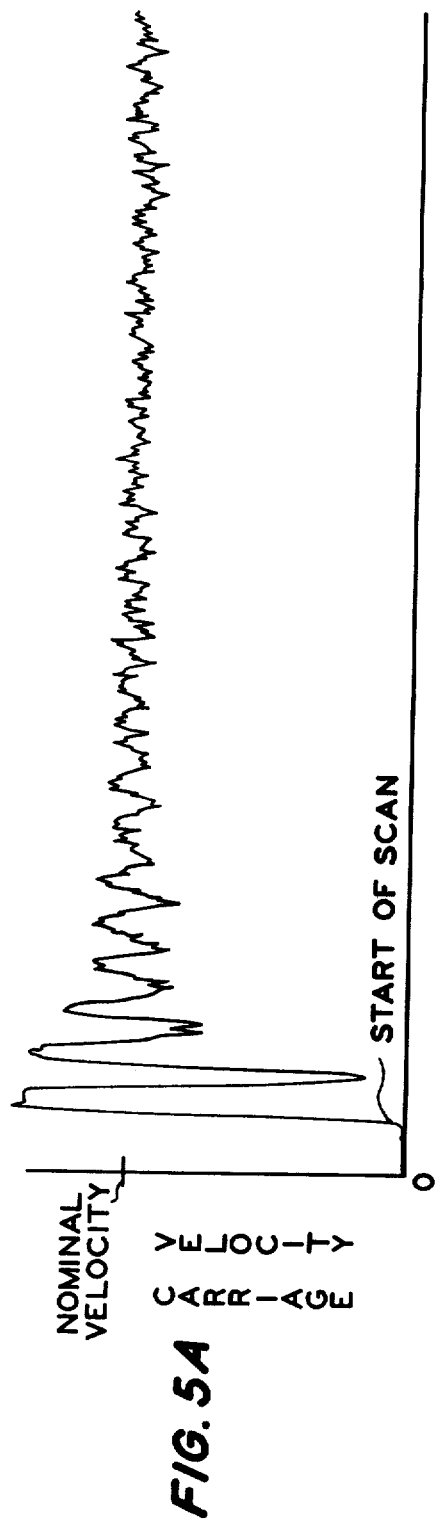
FIG. 5A shows the unbiased mode and FIG. 5B shows the biased mode.

Upon creation of the force couple (or torque $C_1$) carriage 30 is first pulled in a clockwise (left) direction. Rail 32 is then represented by the dotted position although it is the carriage which has in fact moved to the left in the figure. This moment is translated into a linear motion at the outboard end resulting in a reduction of scan speed of mount 30B. Wtih continued acceleration, the carriage is deflected by rail 32 from this initial clockwise movement causing the carriage to come up against the opposite side of the rail. This oscillatory rotation of the carriage, resolves itself into a linear oscillation of the carriage near the undriven side of the carriage (near rail 31). The carriage continues to open and close the clearance between mount 30B and rail 31 until natural damping in the system dissipates the energy input resulting from the initial acceleration. This oscillating movement occurs over perhaps the first 1-1½ inches of carriage travel. The results are shown by the alternating light and dark portions of the leading edge of the image being formed on photoconductive member 10 in FIG. 3. The darker areas occur during the slower scan rates: the lighter areas result from the faster scan rate. FIG. 5A further illustrates the carriage oscillation in graphic form. Carriage velocity, as measured at carriage mount 30B is plotted against scan time. At start of scan, the acceleration is sharp, overshooting the nominal value; then reversing direction and slowing down again overshooting the nominal value. The pattern is repeated and the time to achieve stable nominal velocity would correspond to the previously mentioned 1 to 1½" of scan travel.

Figure 5B:
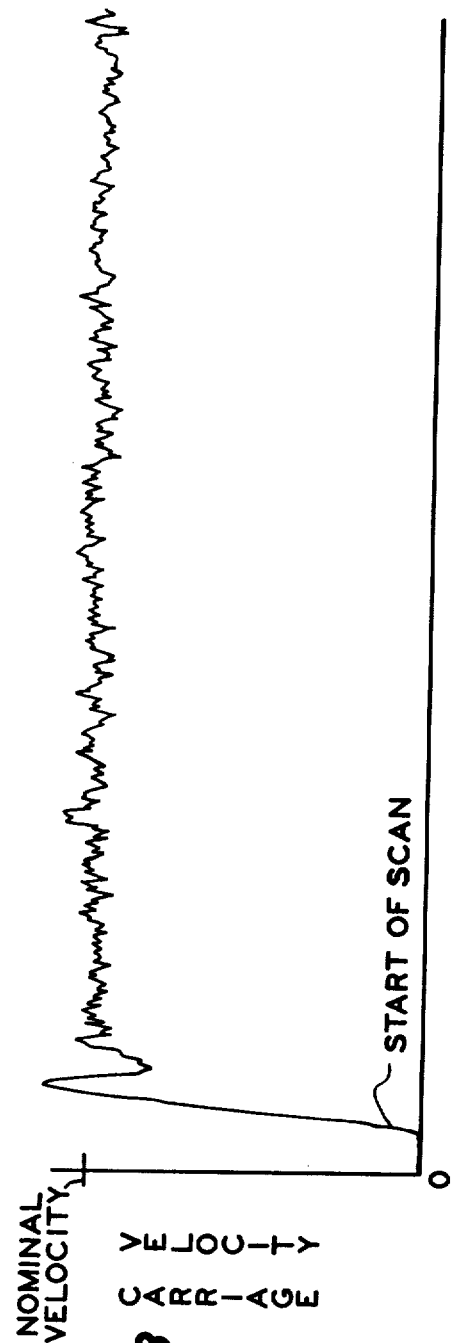
Figure 6:
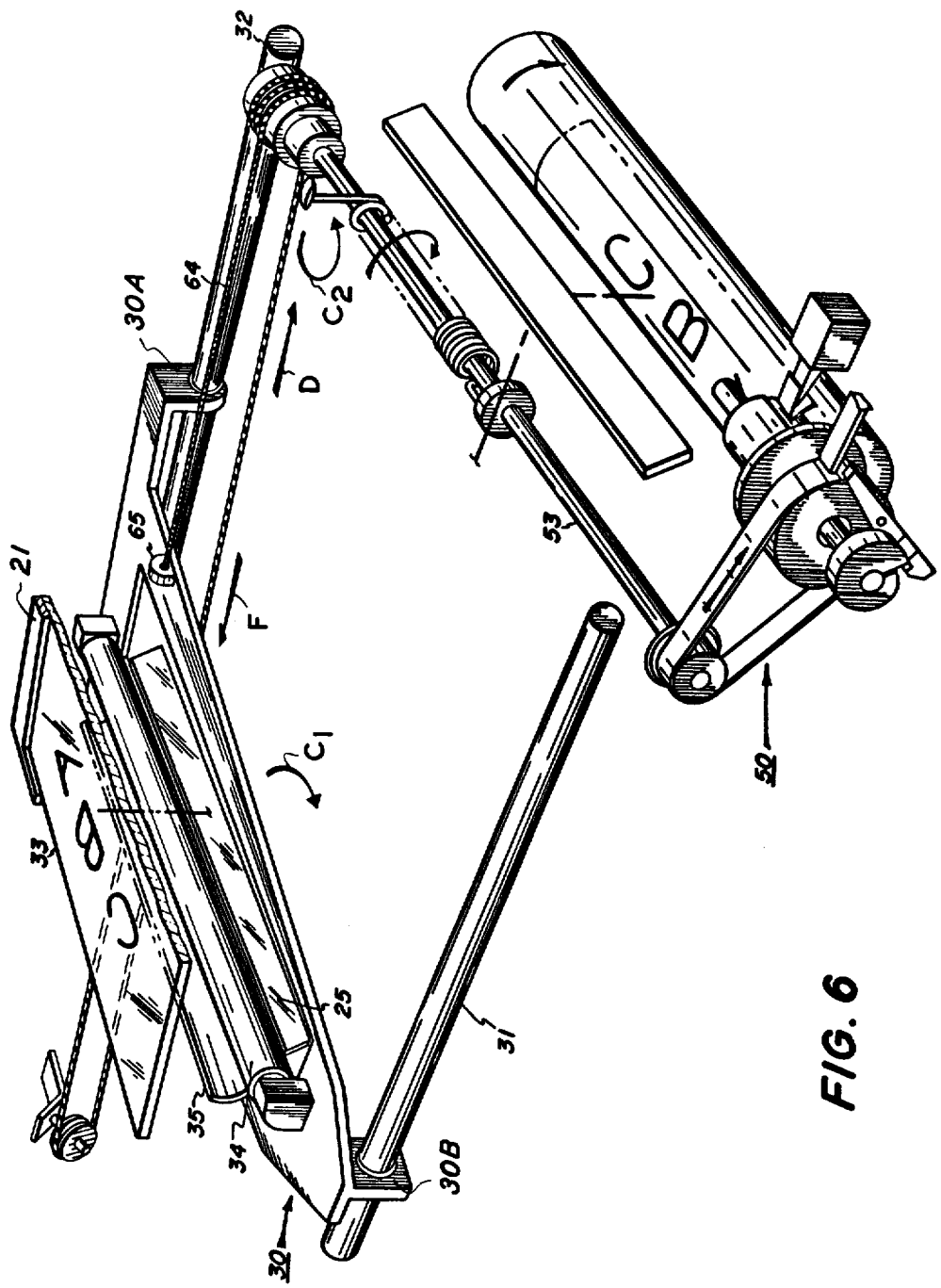
FIG. 6 is a perspective view showing an improved drive cable mounting according to the present invention.

FIG. 6 shows an improved scanning system wherein the scan carriage drive arrangement of FIG. 3 is modified so as to neutralize the undesirable force couple present at start of scan. As shown in FIG. 6, two changes have been made in the cable drive system to create a bias on the carriage 30 which will serve to neutralize the force couple created at the start of acceleration. Cable 64 is rerouted so that the end attached to pulley 63 is now located a closer distance to guide rail 32. The cable preferably is located as close to rail 32 as is possible consistent with the design of the particular system. One way to accomplish this is to increase the length of the cable by wrapping the cable several additional times about pulley 63. Additionally, idler pulley 66 has been laterally moved away from rail 32 (to the left in the figure) and is mounted at an angle of about 45° relative to its previous vertical position. The effect of this cable adjustment is to create a force couple $C_2$ on the carriage so that the rail 32 running inside the sliding contact 32A is always in the dotted position in FIG. 4. FIG. 5B illustrates the effect on carriage velocity using this modified biasing arrangement. Preferably, bias exerted upon carriage 30 should be strong enough to both neutralize the couple, $C_1$ developed between F and D and also sufficient to maintain bushings 32A, in sliding contact with the left (outboard) side of the rail 32 and bushing 32B in sliding contact with the right (inboard) side of the rail 32 throughout the length of scan. This will cause mount 30B to ride freely on rail 31 and insure a steady uniform travel for the carriage.

It is noted that with the new arrangement of bias cable 64, the top and bottom segments are still parallel but now lie in a plane which is at an angle with respect to the vertical plane.

The above cable biasing technique is used in the context of providing a simple, economical method of overcoming the lead edge copy quality problem in the environment of a single drive system for a scan carriage. The particular requirements of the system will dictate whether additional components must be modified to accomplish the principles of this invention, i. e. the drive cable pulley location may have to be adjusted or grooves added to the pulley take up surface.

What is claimed is:

1. In a copying device in which an original to be copied is supported in a stationary condition upon a flat viewing platen and a flowing light image of the original is recorded upon a moving photosensitive plate, said copying device including:
   a scanning carriage having optical scanning components mounted thereon and movably positioned on a pair of guide rails below said platen;
   means for driving said carriage in a horizontal plane so as to scan successive areas of said original and at scan rates which create at the start of scan a first force couple acting in the plane of carriage travel and tending to impart a rotary motion to said carriage;
   drive means including a drive cable entrained about a drive pulley mounted adjacent an inboard guide rail and an idler pulley, said idler pulley having a vertical dimension inclined at an angle of less than 90° with respect to said horizontal plane,
   whereby said drive cable is tensioned so as to create a second force which at least neutralizes the effects of said first couple.

* * * * *